(12) United States Patent
Lairsey et al.

(10) Patent No.: US 12,294,586 B2
(45) Date of Patent: May 6, 2025

(54) SYSTEMS AND METHODS FOR INSTANCE-BASED PERMISSIONS FOR DATA CENTER MANAGEMENT TASKS

(71) Applicant: Dell Products, L.P., Round Rock, TX (US)

(72) Inventors: Jeffrey M. Lairsey, Round Rock, TX (US); Margaret Jenae Patton, Austin, TX (US); Carlin Mendonca, Austin, TX (US); Saurav Shrestha, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 299 days.

(21) Appl. No.: 17/582,948

(22) Filed: Jan. 24, 2022

(65) Prior Publication Data

US 2023/0239307 A1    Jul. 27, 2023

(51) Int. Cl.
*H04L 9/40* (2022.01)

(52) U.S. Cl.
CPC .......... *H04L 63/105* (2013.01); *H04L 63/108* (2013.01)

(58) Field of Classification Search
CPC ............................. H04L 63/105; H04L 63/108
See application file for complete search history.

(56) References Cited

U.S. PATENT DOCUMENTS

| | | | | |
|---|---|---|---|---|
| 7,308,498 B1* | 12/2007 | Olsen | .................... | H04L 67/563 709/224 |
| 9,916,450 B2* | 3/2018 | Moloian | .................. | H04L 63/10 |
| 10,635,829 B1* | 4/2020 | Barker | ................... | H04L 63/102 |
| 10,771,337 B1 | 9/2020 | Das et al. | | |
| 10,931,682 B2* | 2/2021 | Ezra | ...................... | H04L 63/102 |
| 11,356,273 B1* | 6/2022 | Patel | ........................ | H04L 9/088 |
| 11,553,008 B1* | 1/2023 | Robinson | .............. | H04L 63/105 |

(Continued)

OTHER PUBLICATIONS

International Search Authority (ISA), "International Search Report," International Application No. PCT/US2023/060362, Jun. 15, 2023, 2 pages, publisher Commissioner for Patents—PCT, Alexandria, Virginia.

(Continued)

*Primary Examiner* — James R Turchen
(74) *Attorney, Agent, or Firm* — Fogarty LLP (57) ABSTRACT

System and methods support a console for use in a data center, where the console allows granting of one-time permissions for administrators to perform management tasks in the data canter. A denial is detected of a request by a lower-level administrator to perform a management task, where the request is denied on the basis of the lower-level administrator having insufficient privileges to perform the management task. In response to the denial based on insufficient privileges, a higher-level administrator is identified with sufficient privileges to authorize a one-time permission for the management task. A request is issued for a one-time permission from the upper-level administrator for the lower-level administrator to perform the management task. When approval is received from the upper-level administrator, a one-time permission is configured that authorizes the lower-level administrator to perform the management task. Upon detecting a completion of the management task, the one-time permission is revoked.

20 Claims, 3 Drawing Sheets

(56) References Cited

U.S. PATENT DOCUMENTS

| | | | |
|---|---|---|---|
| 2006/0190574 A1 | 8/2006 | Yoshikawa et al. | |
| 2013/0085800 A1* | 4/2013 | Radkowski | G06Q 10/0635 |
| | | | 705/7.28 |
| 2016/0182527 A1* | 6/2016 | Lietz | G06F 21/604 |
| | | | 726/6 |
| 2016/0277411 A1* | 9/2016 | Dani | G06F 21/6218 |
| 2016/0352752 A1* | 12/2016 | Bush | H04L 63/0838 |
| 2017/0006044 A1* | 1/2017 | Ezra | H04L 67/145 |
| 2018/0007053 A1* | 1/2018 | Grant | H04L 63/102 |
| 2019/0245843 A1* | 8/2019 | Ja | G06F 21/41 |
| 2019/0260741 A1* | 8/2019 | Ashok | H04L 63/083 |
| 2020/0092294 A1* | 3/2020 | Sharma | H04L 63/102 |
| 2020/0252431 A1* | 8/2020 | Byrne | H04L 63/104 |
| 2020/0302040 A1* | 9/2020 | Kaja | G06F 21/54 |
| 2020/0344253 A1* | 10/2020 | Kurup | G06N 20/00 |
| 2020/0372161 A1* | 11/2020 | Wu | H04L 67/306 |
| 2020/0403883 A1 | 12/2020 | Mahamuni et al. | |
| 2021/0258321 A1* | 8/2021 | Vegulla | G06N 5/04 |
| 2021/0288972 A1* | 9/2021 | Koch | H04L 63/20 |
| 2021/0397729 A1* | 12/2021 | McQuaid | G06F 9/4552 |
| 2022/0300332 A1* | 9/2022 | Garaev | G06F 21/629 |
| 2022/0394052 A1* | 12/2022 | Grossman-Avraham | |
| | | | G06F 21/552 |

OTHER PUBLICATIONS

International Search Authority (ISA), "Written Opinion of the International Searching Authority," International Application No. PCT/US2023/060362, Jun. 15, 2023, 8 pages, publisher Commissioner for Patents—PCT, Alexandria, Virginia.

The International Bureau of WIPO, "International Preliminary Report on Patentability," International Application No. PCT/US2023/060362, Jul. 30, 2024, 9 pages, WIPO, 34, chemin des Colombettes 1211 Geneva 20, Switzerland.

* cited by examiner

SYSTEMS AND METHODS FOR INSTANCE-BASED PERMISSIONS FOR DATA CENTER MANAGEMENT TASKS

FIELD

The present invention relates to information handling systems (IHSs). More specifically, embodiments of the invention relate to administering IHSs comprised within a data center.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Groups of IHSs may be housed within data center environments. A data center may include a large number of IHSs, such as enterprise blade servers that are stacked and installed within racks. A data center may include large numbers of such server racks that are organized into rows of racks. Administration of such large groups of IHSs may require teams of remote and local administrators working in shifts in order to support around-the-clock availability of the data center operations while minimizing downtime. As data centers continue to increase is size, the number of administrators needed to run and maintain these systems also continues to increase. In a data center environment, a vast array of management tasks may be performed by teams of administrators in maintaining the data center.

SUMMARY OF THE INVENTION

In various embodiments, IHSs (Information Handling Systems) are configured to support a console for use in managing a data center. The IHSs may include: one or more processors; one or more memory devices coupled to the processors, the memory devices storing computer-readable instructions that, upon execution by the processors, cause the IHS to: detect a denial of a request for a lower-level administrator of the data center to perform a management task involving an asset of the data center, wherein the request is denied on the basis of the lower-level administrator having insufficient privileges to perform the management task; in response to detecting the denial of the lower-level administration based on insufficient privileges, identify a higher-level administrator with sufficient privileges to authorize a one-time permission for the management task; issue a request for the one-time permission from the upper-level administrator to the lower-level administrator to perform the management task; when approval is received from the upper-level administrator, configure a one-time permission authorizing the lower-level administrator to perform the management task; and upon detecting a completion of the management task, revoke the one-time permission.

In some IHS embodiments, the management task comprises removing an IHS in the datacenter from service. In some IHS embodiments, the management task comprises resetting a hardware component installed in an IHS in the datacenter. In some IHS embodiments, the management task comprises modifying firmware of a hardware component installed in an IHS in the datacenter. In some IHS embodiments, the configuring of one-time permission comprises specifying a duration after which the one-time permission expires. In some IHS embodiments, the one-time permission expires based on expiration of a token generated in response to the approval from the upper-level administrator. In some IHS embodiments, the token is provided to the lower-level administrator for use in gaining use of the asset in order to perform the management task. In some IHS embodiments, the configuring of the one-time permission comprises specifying a condition triggering revocation of the one-time permission. In some IHS embodiments, the condition triggering revocation of the one-time permission comprises a change to firmware of a hardware component installed in an IHS in the datacenter. In some IHS embodiments, the condition triggering revocation of the one-time permission comprises removing an IHS in the datacenter from service. In some IHS embodiments, execution of instructions by the processor further causes the IHS to: notify the upper-level administrator of the revoked one-time permission due to the detected completion of the management task. In some IHS embodiments, execution of instructions by the processor further causes the IHS to: notify the upper-level administrator of the revoked one-time permission due to the detected removal of the IHS in the datacenter from service. In some IHS embodiments, execution of instructions by the processor further causes the IHS to: notify the upper-level administrator of the revoked one-time permission due to the expiration of the one-time permission. In some IHS embodiments, execution of instructions by the processor further causes the IHS to: initiating elevated logging of actions by the lower-level administrator while utilizing the one-time permission. In some IHS embodiments, execution of instructions by the processor further causes the IHS to: provide the lower-level administrator with a user interface the displays a request for the one-time permission from the upper-level administrator and provides a rationale provided by the lower-level administrator for providing the one-time permission. In some IHS embodiments, the rationale provided by the lower-level administrator is included in the request for the one-time permission issued to the upper-level administrator.

In various additional embodiments, methods support a console for use in managing a data center. The methods may include: detecting a denial of a request for a lower-level administrator of the data center to perform a management task involving an asset of the data center, wherein the request is denied on the basis of the lower-level administrator having insufficient privileges to perform the management task; in response to detecting the denial of the lower-level administration based on insufficient privileges, identifying a higher-level administrator with sufficient privileges to authorize a one-time permission for the management task; issuing a request for the one-time permission from the upper-level administrator for the lower-level administrator to perform the management task; when approval is received from the upper-level administrator, configuring a one-time permission authorizing the lower-level administrator to perform the management task; and upon detecting a completion of the management task, revoking the one-time permission. In some method embodiments, the management task comprises removing an IHS in the datacenter from service.

In various additional embodiments, computer-readable storage devices included instructions stored thereon for supporting a console for use in managing a data center. Execution of the instructions by one or more processors causes the one or more processors to: detect a denial of a request for a lower-level administrator of the data center to perform a management task involving an asset of the data center, wherein the request is denied on the basis of the lower-level administrator having insufficient privileges to perform the management task; in response to detecting the denial of the lower-level administration based on insufficient privileges, identify a higher-level administrator with sufficient privileges to authorize a one-time permission for the management task; issue a request for the one-time permission from the upper-level administrator for the lower-level administrator to perform the management task; when approval is received from the upper-level administrator, configure a one-time permission authorizing the lower-level administrator to perform the management task; and upon detecting a completion of the management task, revoke the one-time permission. In some stored device embodiments, configuring of one-time permission comprises specifying a duration after which the one-time permission expires.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
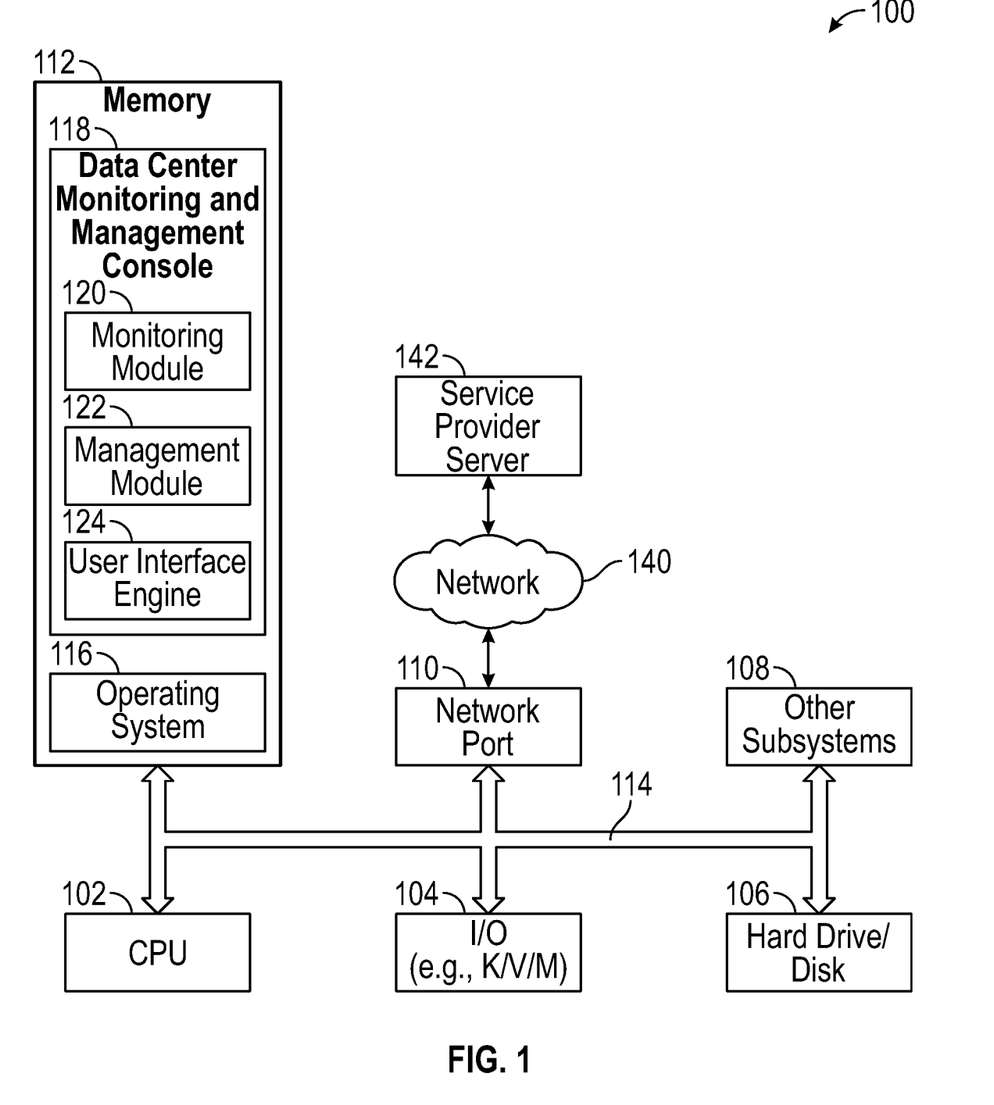
FIG. 1 is a diagram illustrating certain components of an information handling system (IHS), according to embodiments, that is configured to support instance-based permissions for data center management tasks.

In the following description, numerous specific details are set forth in order to provide a thorough understanding of embodiments of the present invention. It will be apparent to one skilled in the art that embodiments of the present invention may be practiced without some of these specific details. Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). While embodiments of the present invention have been illustrated and described, the invention is not limited to these embodiments only. Numerous modifications, changes, variations, substitutions, and equivalents will be apparent to those skilled in the art, without departing from the scope of the invention, as described in the claim FIG. 1 is a generalized illustration of an information handling system 100, according to embodiments, that is configured to support instance-based permissions for data center management tasks. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108 i.e. any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. Further, while a single information handling system 100 is illustrated, the term "system" shall also be taken to include any collection of systems or sub-systems that individually or jointly execute a set, or multiple sets, of instructions to perform one or more computer functions.

In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114 operable to transmit communications between the various hardware components. System memory 112 further comprises operating system (OS) 116 and in various embodiments may also comprise a data center monitoring and management console 118. In one embodiment, the information handling system 100 is able to download the data center monitoring and management console 118 from the service provider server 142. In another embodiment, the data center monitoring and management console 118 is provided as a service from the service provider server 142.

In certain embodiments, the data center monitoring and management console 118 may include a monitoring module 120, a management module 122, and a user interface engine 124, or a combination thereof. In certain embodiments, the data center monitoring and management console 118 may be implemented to perform a data center monitoring and management operation. In certain embodiments, the data center monitoring and management operation may be performed during operation of an information handling system 100. The data center monitoring and management console 118 performs certain operations which may include a data center management task. The data center management task may include any function, operation, procedure, or process performed, directly or indirectly, within a data center monitoring and management environment to manage the operational status of a particular data center asset, as described in greater detail herein.

A data center administrator may use IHS 100, and in particular console 118, to perform various data center management tasks. Some or all of these management tasks may require the administrator to have sufficient privileges, where these privileges may be implemented by various components within the data center. One-time management task permissions providing according to the embodiments described herein serve an important operational purpose by enabling an administrator with privileges to perform a specific management task to grant elevated rights to another administrator to complete that specific management task, but not any other management tasks. Privileges for data center management tasks may be built into operating systems, file systems, applications, databases, hypervisors, and cloud management platforms, etc. Through the embodiments described herein, administrators may be granted with one-time elevated access to certain of such systems.

Figure 2:
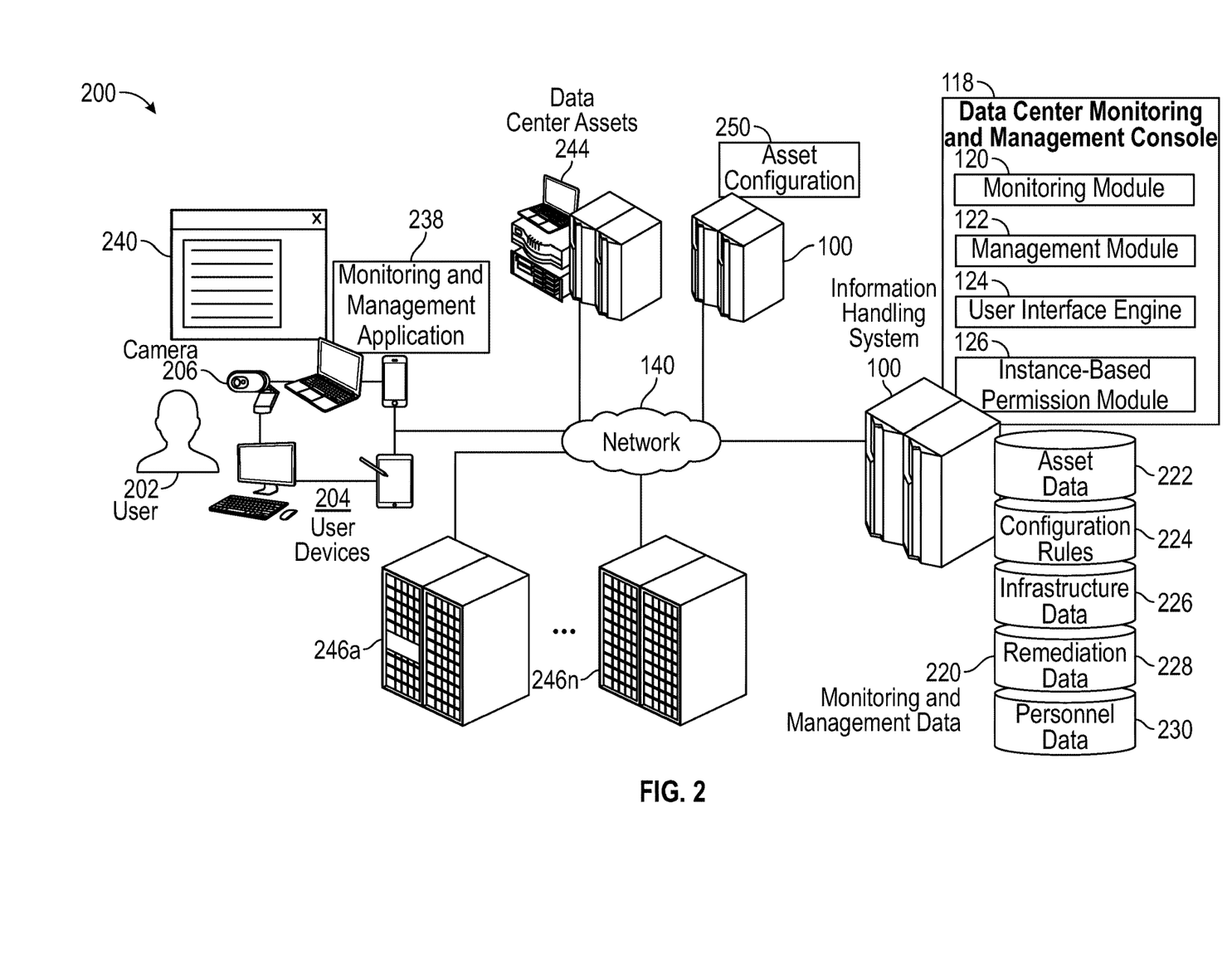
FIG. 2 is a diagram of a data center system configured to support instance-based permissions for data center management tasks.

FIG. 2 is a diagram of a data center system configured to support instance-based permissions for data center management tasks. A data center may be a building, a dedicated space within a building, or a group of buildings, used to house a collection of interrelated data center assets 244 implemented to work in combination with one another. As likewise used herein, a data center asset 244 may be any IHS, an individual hardware component or software that operates within the data center, or that is available for operation within the data center. In certain embodiments, a data center asset 244 may include a product, or a service, or a combination of the two. Examples of data center assets 244 may include personal computers (PCs), laptop PCs, tablet computers, rack-mounted servers, mainframe computers, Redundant Arrays of Independent Disks (RAID) storage units and their internal components. Likewise, examples of network devices that are data center assets 244 may include routers, switches, hubs, repeaters, bridges, gateways, and so forth. In some embodiments, data center asset 244 may include certain data center personnel, such as a data center system administrator, operator, or technician. Other examples of a data center asset 244 may include maintenance, repair, and operations (MRO) items, such as replacement and upgrade parts for other data center assets 244. In certain embodiments, such MRO items may be in the form of consumables, such as air filters, fuses, and fasteners. Data center asset 244 may also include software, firmware, and instructions used by hardware components that are themselves data center assets.

In certain embodiments, the data center may be managed by administrators 202 using a data center monitoring and management console 118. The data center monitoring and management console 118 may operate in support of any task, function, procedure, or process performed within a data center monitoring and management environment 200 in order to procure, deploy, configure, implement, operate, monitor, manage, maintain, or remediate a data center asset 244. Through operations supported by console 118, an administrator may perform a wide variety of management tasks within the data center. As described in additional detail below, embodiments provide capabilities by which an administrator may be granted one-time privileges for performing some of these management tasks supported by the operation of console 118.

In certain embodiments, a data center monitoring and management operation may include a data center management task. As used herein, a data center management task may be any function, operation, procedure, or process performed within a data center monitoring and management environment 200 to manage a particular data center asset 244. Some of these management tasks may be undertake by administrators with only base-level privileges within the data center. For instance, in some management tasks, a particular data center asset 244 may be configured to generate an alert if an operational status exceeds certain parameters. For instance, an internal cooling fan of a server may begin to fail, which in turn may cause the operational temperature of the server to exceed its rated level. In this example, the server may be configured to generate an alert, which provides notification of the occurrence of a data center issue. In such embodiments, the data center monitoring and management console 118 may be used to configured and to receive such alerts. Such data center management tasks may not require elevated administrative privileges within the data center and may thus be performed by any administrator. However, many data center management tasks require elevated privileges. For instance, installing firmware updates or shutting down a rack-mounted server may be protected management tasks that can only be performed by administrators with elevated privileges within the data center.

In certain embodiments, the data center monitoring and management console 118 may be implemented to include a monitoring module 120, a management monitor 122, and a user interface (UI) engine 124, an instance-based permission module 126, or a combination thereof. In certain embodiments, the monitoring module 120 may be implemented to monitor the procurement, deployment, implementation, operation, management, maintenance, or remediation of a particular data center asset 244 at any point in its lifecycle. In certain embodiments, the management module 122 may be implemented to manage the procurement, deployment, implementation, operation, monitoring, maintenance, or remediation of a particular data center asset 244 at any point in its lifecycle. In various embodiments, the UI engine 124 may generate and/or support any number of UIs for monitoring and management of data center assets 244.

In certain embodiments, the data center monitoring and management environment 200 may include a repository of monitoring and management data 220. In certain embodiments, the repository of monitoring and management data 220 may be local to the information handling system 100 executing the data center monitoring and management console 118, or may be located remotely from the console. In various embodiments, the repository of monitoring and management data 220 may include certain information associated with data center asset data 222, data center asset configuration rules 224, data center infrastructure data 226, data center remediation data 228, and data center personnel data 230.

As used herein, data center asset data 222 refers to information associated with data center assets 244. For example, asset data 222 associated with a particular server of the data center may include the number and type of processors the server can support, the speed and architecture, minimum and maximum amounts of memory supported by these processors, various storage configurations supported by the server and the number, type, and speed of input/output ports of the server. Data center asset configuration rules 224 may include rules used to configure data center assets 244. In certain embodiments, asset configuration rules 224 may be used to verify that a particular data center asset 244 configuration is the most optimal for a location in the data center, for a workload, or to interact with other data center assets 244. In certain embodiments, an asset configuration system 250 may be used through the console 118 to perform a data center asset configuration or remediation operation using the configuration rules 224. Data center infrastructure 226 data may include data associated with infrastructure of the data center and may include data describing physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, and/or physical security systems.

Data center personnel data 230 may include any data associated with data center personnel who may procure, deploy, configure, repair, manage, and/or operate data center assets 244. In some embodiments, the data center personnel data 230 may include education, certification, and skill level information for administrators. In some embodiments, the data center personnel data 230 may include security-related information, such as security clearances, user IDs, passwords, security-related biometrics, and authorizations for administrators.

Using this permission data stored in personnel data 230, each data center personnel, such as administrators, may be assigned authorizations in form of privileges to access certain data center asset 244 based on levels of privileges defined. In some embodiments, certain data center assets 244 may be accessible or manageable by only data center personnel that have been assigned privileges of at least a certain level. In a data center environment, administrative privileges are typically organized into a hierarchy, where higher level administrators have the most expansive permissions and base-level administrators have the most restricted privileges. In some embodiments, data center administration privileges may be defined though various levels such as level 1-3 privileges, in which level 1 may be the lowest level of privileges, in which case, level 2 would be middle level and level 3 would be the highest level of privileges. In various embodiments, certain data center assets may only be accessible by data center personnel which have been assigned privileges of at least an elevated level of privileged within the privilege hierarchy. In some embodiments, an administrator may assign management tasks to any administrator with lower-level datacenter privileges, and may thus also have authority to grant the privileges for the lower-level administrator to access the data center assets that are required to perform the management task.

Embodiments allow administrative permissions to be assigned in this manner, but restrict the lower-level administrator to performing a single instance of the management task, thus limiting the damage that can be done by a malicious actor having control of an administrative account, whether directly or indirectly. Additionally, in traditional systems, once permissions have been granted to a user, the user granting the permission typically have no visibility into how or when the granted permissions are being used. As described in additional detail below, issuing one-time privileges through the instance-based permission module not only minimizes the potential for a security breach occurring, the instance-based permission module also limits the scope of a breach, should one occur. Using the instance-based permission module, security protocols may be more effectively used to dismantle multiple points of the cyber-attack chain, providing protection against both external attacks as well as internal attacks by compromised administrators.

Data center remediation data 228 may include information associated with the remediation of data center issues, such as the date and time an alert was received indicating the occurrence of the data center issue, the amount of elapsed time before a remediation operation was begun after receiving the alert, and the amount of elapsed time to complete a remediation operation. Data center remediation data 228 may also include information related to frequency of data center issues, information related to causes and error codes associated with data center issues, and the location of data center assets 244 associated with a data center issue. Data center remediation data 228 may also include information associated with data center asset 244 replacement parts, dependencies, documentation, tools, diagnostic equipment, personnel, software upgrades, or third-party services that are associated with a data center remediation operation.

As illustrated, the data center monitoring and management environment 200 includes one or more server racks 246*a-n* that may include any number of data center assets 244. In certain embodiments, a data center asset 244 may be implemented to process a workload. A workload may be a measure of information processing that can be performed by one or more data center assets 244, individually or in combination with one another, within a data center monitoring and management environment 200. In certain embodiments, a workload may be implemented to be processed in a virtual machine (VM) environment, familiar to skilled practitioners of the art. In various embodiments, a workload may be implemented to be processed as a containerized workload, likewise familiar to those of skill in the art.

In various embodiments, the data center monitoring and management console 118, may implement failure tracking though the capture of data center asset 244 telemetry. In various embodiments, the data center asset 244 telemetry may include data associated with the occurrence of events, such as the failure, or anomalous performance, of a particular data center asset 244, or an associated workload 360. In certain embodiments, the data center asset 244 telemetry may be captured incrementally to provide a historical perspective of the occurrence, and evolution, of an associated data center issue.

In certain embodiments, a user 202 may operate a user device 204 to interact with the data center monitoring and management console 118. As used herein, a user device 204 refers to an information handling system such as a personal computer, a laptop computer, a tablet computer, a personal digital assistant (PDA), a smart phone, a mobile telephone, or other device that is capable of processing and communicating data. In certain of these embodiments, the mobile user device 204 may be used at various locations within the data center monitoring and management environment 200 by the user 202 when performing a data center management task, described in greater detail herein.

In certain embodiments, a user device 204 may be implemented with a camera 206, such as a video camera known to skilled practitioners of the art. In certain embodiments, the camera 206 may be integrated into the user device 204. In certain embodiments, the camera 206 may be implemented as a separate device configured to interoperate with the user device 204. As an example, a webcam familiar to those of skill in the art may be implemented receive and communicate various image and audio signals to a user device 204 via a Universal Serial Bus (USB) interface.

In certain embodiments, the user device 204 may be configured to present a data center monitoring and management console user interface (UI) 240. In certain embodiments, the data center monitoring and management console UI 240 may be implemented to present a graphical representation of data center monitoring and management information generated by console 118. Through the UIs supported by console, user 202 may perform a wide variety of management tasks related to the data center. As described, a user 202 may be assigned various permissions with regard to management tasks that the user is authorized to perform within the data center. Such management tasks may be undertaken through various UIs supported by console, including graphical user interface and command line user interfaces. However, based on the permissions granted that have been granted, user 202 may be limited to performing only authorized management tasks.

Data centers may include a large number of assets, which may be included within numerous rows of racks, each filled with servers, networking equipment, power supplies, storage arrays, cooling equipment, etc. Accordingly, it is not uncommon for such data centers to employ a s significant number of data center system administrators and technicians, each of which may be a user 202 that performs management tasks supported by console 118. In such scenarios, not all administrators will have all the same permissions within the data center, such that most administrators only have permissions to perform certain management tasks. The permissions granted to administrators are typically stratified, with top-level administrators having the most expansive permissions and base-level administrators have the most limited permissions. In some instances, any administrator with privileges to perform a management task also has permission to delegate that management task to a lower-level administrator.

Due to the large number of possible management tasks and multiple different administrators it is not uncommon for an administrator to delegate or assign a particular data center management task to another administrator. It is common for administrators to receive a stream of data center alerts via the different UIs 240 that the administrator may be using. It is also not uncommon for an administrator to receive multiple such alerts that have been classified as "critical." In such scenarios, the data center administrator may elect to delegate some of these time critical tasks to lower-level administrators. Especially when time constraints are an issue, it is advantageous for an administrator to be able to perform such delegations without having to determine whether the lower-level administrator has permission to perform every management task necessary to address the alert. In addition, if the lower-level administrator has insufficient permissions to complete an assigned management task, it is further advantageous for the upper-level administrator to be able to continue without having to manually reconfigure the lower-level administrator's privileges in order to grant them sufficient privileges necessary to complete the task.

In instances where an administrator delegates or assigns a data center management task to a lower-level administrator, many scenarios are possible where the lower-level administrator does not have privileges necessary to complete every aspect of that management task. In embodiments, an administrator is provided with capabilities for granting one-time permissions that allows a lower-level administrator to perform a management task that the lower-level administrator does not otherwise have sufficient privileges to perform. Rather than require an administrator to grant such permissions preemptively, embodiments avoid such burdens by initiating procedures for the administrator to grant a lower-level administrator with permission to perform a management task. However, the upper-level administrator is prompted to grant such permission only when the lower-level administrator attempts to perform the assigned management task, but is denied due to insufficient privileges. In embodiments, when an administrator tries to perform a management task that the administrator does not have permission to perform, rather than just denying the request—as existing systems do-embodiments issue a request for the assigning administrator to grant a one-time permission that authorizes the administrator to perform the management task.

Figure 3:
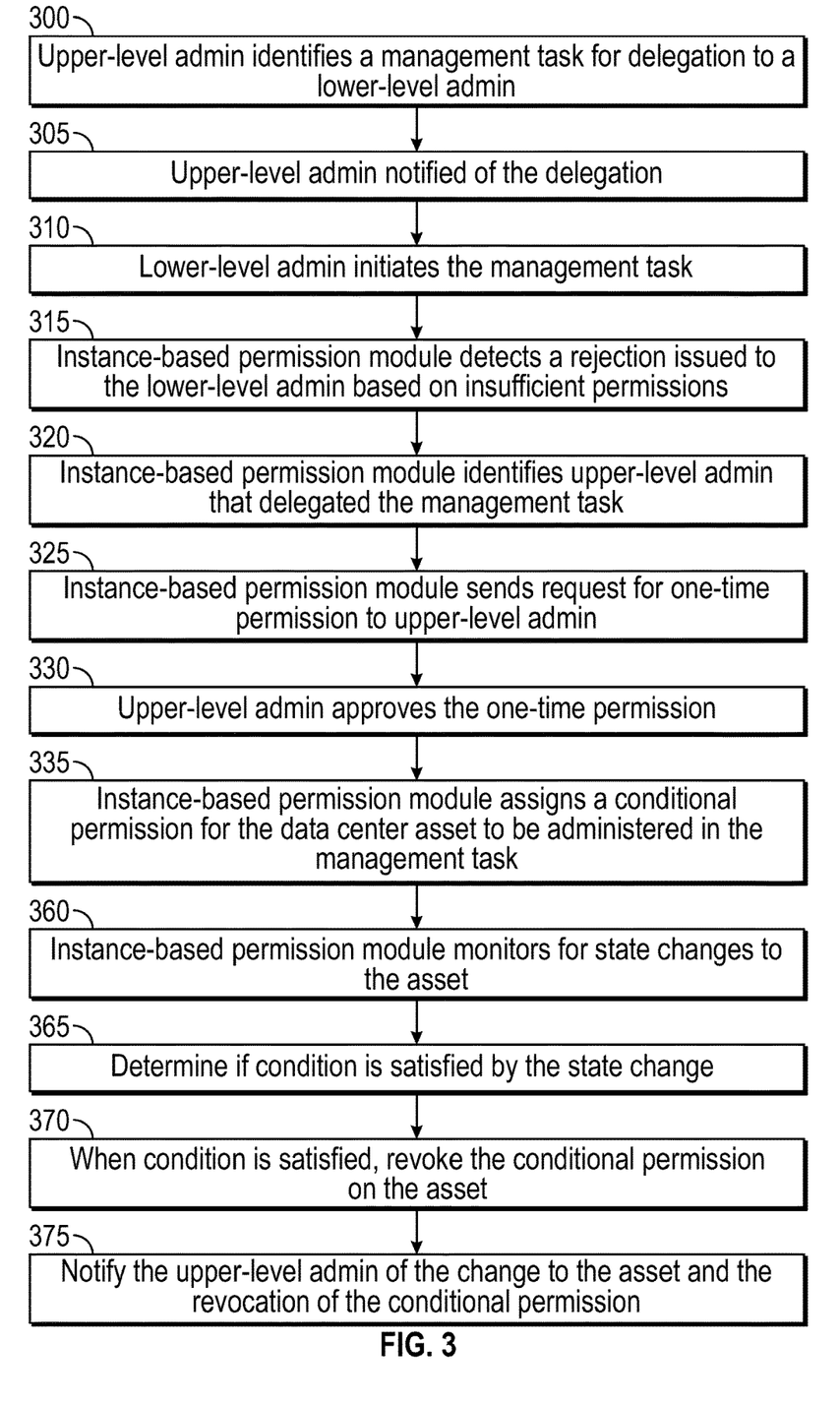
FIG. 3 is a flowchart describing certain steps of a method, according to embodiments, for instance-based permissions for data center management tasks.

FIG. 3 is a flowchart describing certain steps of a method, according to embodiments, for granting and utilizing instance-based permissions for performing data center management tasks. Some embodiments may begin, at 300, with an upper-level administrator identifying a management task for delegation to a lower-level administrator. As described above, data center administration privileges that may be granted to administrators may be organized into a hierarchy of privilege levels, with lower-level administrators having fewer privileges than higher-level administrators. In some instances, the management task that has been identified for delegation may be time-critical, such that the higher-level administrator may not have sufficient time to complete this management task personally, and thus chooses to delegate the task to a lower-level administrator for the sake of addressing this management task in a timely manner. In light of the time-critical nature of the task and the higher-level administrator already being fully engaged in completing other management tasks, requiring the higher-level administrator to investigate and configure the privileges necessary for the lower-level administrator to complete the assigned management task would be a significant burden on the higher-level administrator. Embodiments alleviate this burden.

As indicated in FIG. 3, at 305, the lower-level administrator is notified of the delegation of the management task from the higher-level administrator. In some embodiments, the instance-based permission module 126 of the console 118 monitors the delegation of the management tasks made via the console. Upon detecting the delegation of a management task, the instance-based permission module may record an entry of the delegation. At 310, the lower-level administrator initiates the assigned management task. In some embodiments, the various hardware and software systems of the datacenter may report to the console 118 any failure by an administrator to present credentials, such as encryption keys, access keys, digital certificates, or passwords, that establish sufficient privileges to perform a requested management task.

In certain instances, a lower-level administrator may not have the required privileges to perform every aspect of the assigned management task. For instance, the management task may require use of a data center asset, such as a network switch or a highly-restricted server, that the lower-level administrator does not have permission to access. In another example, the lower-level administrator may not have sufficient privileges to perform a certain operation supported by a data center asset. For instance, the lower-level administrator may have insufficient privileges to update the firmware for a hardware component or to shut down a server, and thus remove it from service.

When trying to access data center assets or perform operations for which the lower-level administrator has insufficient privileges, the lower-level administrator receives a notification of having insufficient privileges to access the required asset or complete the operation. In some embodiments, the instance-based permission module monitors all such rejections due to insufficient privileges that are issued through the console 118, or that are detected by any of the management software and tools that interface with the console. For instance, the console 118 may be configured to monitor for any notifications issued by data center assets in response to a command being rejected due to due to the administrator issuing the command having insufficient privileges. Accordingly, at 315, the instance-based permission module detects the lower-level administrator and/or console 118 being provided notification of a rejection due to the lower-level administrator having insufficient privileges to perform a management task.

At 320, the instance-based permission module identifies the higher-level administrator to which a request may be issued for a one-time permission on behalf of the lower-level administrator. In some embodiments, the instance-based permission module may prompt the lower-level administrator to identify the higher-level administrator to which the request should be issued. In some instances, the lower-level administrator may be prompted for such information as part of a notification issued by the instance-based permission module, where the notification informs the lower-level administrator of the request that will be issued for a one-time permission and where the notification requests the lower-level administrator provide or confirm the higher-level administrator that will presumably authorize the lower-level administrator to perform this task. In instances where the lower-level administrator identifies the higher-level administrator to direct the request to, the instance-based permission module may confirm this higher-level administrator does have sufficient privileges to perform the delegated task and/or to authorize a one-time permission for the lower-level administrator to perform the delegated management task.

In some embodiments, the instance-based permission module may rely on information collected through monitoring of management task delegations to determine, or at least infer, the higher-level administrator to which the request for a one-time permission should be issued. In some embodiments, the hierarchy of administrative privileges maintained by the personnel data store 230 may be consulted to identify all of the higher-level administrators with sufficient privileges to grant the lower-level administrator with the one-time permission that is required to complete the management tasks. In such instances, embodiments may issue a request for a one-time permission to all qualified administrators, thus increasing the visibility though out the data center of this one-time permission being requested and providing increased opportunities for the request to be granted in a timely fashion by a qualified administrator. In some embodiments, the instance-based permission module may identify the higher-level administrator(s) to which the request should be issued and may initiate that request automatically as soon as the rejection issued to the lower-level administrator is detected.

Once the appropriate higher-level administrator(s) have been identified, at 325, the instance-based permission module issues the request for the one-time permission to the higher-level administrator. The request to the higher-level administrator may be issued though notifications supported by the console and the management interfaces supported by the console. The request for the one-time permission may identify the lower-level administrator and the management task for which the permission is being requested. In certain embodiments, the request for the one-time permission may include a reason that has been provided by the lower-level administrator for seeking the temporary privilege.

At 330, the higher-level administrator approves the one-time permission for the lower-level administrator to perform the management task, and the lower-level administrator is notified of the granting of the one-time permission. As described in additional detail below, in some instances, the one-time permission may be for a limited duration and may thus expire after a certain time. Any such duration limit on the one-time permission may be included in the notification that is issued to the lower-level administrator. In some embodiments, the granting of the one-time permission may trigger the generation of a one-time password, token or other credentials for use by the lower-level administrator in completing the delegated management task. In such embodiments, the instance-based permission module may include the generated one-time password or other credentials in the notification issued to the lower-level administrator. In some embodiments, a password for use in a one-time permission that has been granted to an administrator may generated by a token generating device, or by an application operating on a personal device, such as the administrator's mobile device. In some embodiments, the token generating device may be designed to display dynamic passwords that are only valid for a certain amount of time. When authentication for the one-time permission is needed, the data center administrator enters the dynamic password displayed by the token device at that time.

In addition to generating credentials for the lower-level administrator, at 335, upon the granting of the one-time permission, the instance-based permission module assigns a conditional permission for use of the data center asset to be administered, thus allowing the management task to be completed by the lower-level administrator. As described above, the console 118 may operate using monitoring and management data 220. For instance, in some embodiments, the console 118 may rely on privilege information maintained in personnel data 230 in order to determine privilege levels that have been assigned to individual administrators. In some embodiments, console 118 may also rely on asset data 222 in order to determine the privileges required to perform certain management tasks for a particular asset. For example, if the data center asset is a network controller, the asset data 222 may specify permission levels required to perform various management tasks on the network controller, such as resetting it, modifying the firmware, re-configure logical ports, configure security settings, etc. In such embodiments, the console may refer to this asset data 222 when evaluating a request to authorize an administrator to perform each of the management tasks.

In some embodiments, the instance-based permission module may insert a conditional privilege in the asset data 222 for the asset to be administered through the one-time permission. The conditional privilege recorded in the asset data may specify the lower-level administrator that has been granted the privilege and may also specify a capability for validating credentials presented by the lower-level administrator, such as the one-time password provided to the lower-level administrator. The conditional privilege recorded in the asset data may also specify a token that must be presented in request received from the lower-level administrator and/or may expire after a certain duration. The conditional privilege entry in the asset data 222 may also specify conditions that serve to restrict a one-time permission, where these conditions may be monitored and enforced in a manner that limits the one-time permission to a single instance. For example, the conditions for a one-time permission may specify events upon which the conditional privilege entry in the asset data 222 will be revoked, such as expiration of the token. Other conditions that may be specified in the asset data 222 may be conditions that detect the completion of management task, such that the conditional privilege is automatically revoked as soon as the management task is completed. For example, a one-time permission may grant authorization to shut down a network controller. The one-time permission is then utilized by the administrator to shut the network controller down. The asset data 222 of the network controller is updated to reflect the shutdown. If the conditional privilege specifies a condition that revokes the one-time permission upon detecting an off state in the network controller, the conditional privilege is revoked as soon as the instance-based permission module detects this change in the asset data 222. In this same manner, the condition may specify a firmware version for a data center asset, such that detection of the data center asset reporting use of this version of the firmware results in revocation of the one-time permission.

Once the lower-level administrator has been granted the one-time permission, in some embodiments, the instance-based permission module 126 of the console 118 may also initiate elevated logging of actions by the lower-level administrator while utilizing the one-time permission authorized by the higher-level administrator. In some embodiments, elevated logging procedures that are initiated for the duration of the one-time permission will be used to capture data related to the lower-level administrator from all monitoring capabilities available in the data center. In certain embodiments, the elevated logging may collect data from only the particular data center assets that are required for the completion of the management task.

At 360, the instance-based permission module initiates a monitor that listens for state changes related to the asset for which the one-time permission has been granted. For example, the instance-based permission module may monitor for any changes to the asset data 222 recorded for the asset. Continuing the network controller example from above, the instance-based permission module monitors for changes to the asset data of the network controller. The instance-based permission module may be configured to monitor for specific changes to the asset data, such as the power state of the network controller, or the version of the firmware that is reported as being in use by the network controller.

Upon detecting a state change in the asset data of the network controller or other asset being monitored, the instance-based permission module determines whether the detected change satisfies the condition specified in the conditional privilege entry for the asset data 222. For instance, if the monitored state changes detect that the network controller power status has been changed to off, or that the new firmware has been installed by the network controller, at 370, the conditional privilege is revoked, with the asset data 222 updated accordingly.

Once the management task has been completed by the lower-level administrator using the one-time permission and the conditional privilege has been revoked, at 375, the higher-level administrator is notified of the change to the asset and the successful resolution of the management task through the use of the one-time permission, such as notification that the network controller firmware has been updated, or an IHS has been removed from service.

In this manner, embodiments allow one-time permission to be provided to administrators, thus supporting efficient delegation of tasks within the datacenter, while minimizing the risk posed by delegation of data center management operations. The potential for misuse or abuse of privilege by insiders presents formidable security risks. The instance-based permissions described herein allow data centers to condense their attack surface, and prevent, or at least mitigate, the damage arising from external attacks as well as from insider malfeasance or negligence. This one-time management task helps to provide fined-grained control, visibility, and auditability over delegated tasks within a data center, with minimal burden to the workflows of the administrators.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An IHS (Information Handling System) configured to support a console for use in managing a data center, the IHS comprising:
   one or more processors;
   one or more memory devices coupled to the processors, the memory devices storing computer-readable instructions that, upon execution by the processors, cause the IHS to:
      detect a denial of a request by a lower-level administrator of the data center to perform a management task involving an asset of the data center, wherein the request is denied on the basis of the lower-level administrator having insufficient privileges to perform the management task;
      in response to detecting the denial of the request by the lower-level administrator based on insufficient privileges, identify a higher-level administrator with sufficient privileges to authorize a one-time permission for the management task;

automatically upon detecting the denial of the request, issue a request for the one-time permission from the higher-level administrator for the lower-level administrator to perform only the management task;

when approval is received from the higher-level administrator, configure a one-time permission authorizing the lower-level administrator to perform only a single instance of the management task only on the asset of the datacenter;

initiate a monitor that detects state changes for the asset of the datacenter of the denied request; and upon the monitor detecting a state change for the asset that corresponds to the management task of the one-time permission, revoke the one-time permission.

2. The IHS of claim 1, wherein the management task comprises removing an IHS in the datacenter from service.

3. The IHS of claim 1, wherein the management task comprises resetting a hardware component installed in an IHS in the datacenter.

4. The IHS of claim 1, wherein the management task comprises modifying firmware of a hardware component installed in an IHS in the datacenter.

5. The IHS of claim 1, wherein the configuring of one-time permission comprises specifying a duration after which the one-time permission expires.

6. The IHS of claim 5, wherein the one-time permission for performing only the management task expires based on expiration of a token generated in response to the approval from the higher-level administrator.

7. The IHS of claim 6, wherein the token is provided to the lower-level administrator for use in gaining use of the asset in order to perform the management task.

8. The IHS of claim 1, wherein the configuring of the one-time permission comprises specifying a condition triggering revocation of the one-time permission.

9. The IHS of claim 8, wherein the condition triggering revocation of the one-time permission comprises a change to firmware of a hardware component installed in an IHS in the datacenter.

10. The IHS of claim 8, wherein the condition triggering revocation of the one-time permission comprises removing an IHS in the datacenter from service.

11. The IHS of claim 1, wherein execution of instructions by the processor further causes the IHS to: notify the higher-level administrator of the revoked one-time permission due to the detected completion of the management task.

12. The IHS of claim 10, wherein execution of instructions by the processor further causes the IHS to: notify the higher-level administrator of the revoked one-time permission due to the detected removal of the IHS in the datacenter from service.

13. The IHS of claim 5, wherein execution of instructions by the processor further causes the IHS to: notify the higher-level administrator of the revoked one-time permission due to the expiration of the one-time permission.

14. The IHS of claim 1, wherein execution of instructions by the processor further causes the IHS to: initiating elevated logging of actions by the lower-level administrator while utilizing the one-time permission.

15. The IHS of claim 1, wherein execution of instructions by the processor further causes the IHS to: provide the lower-level administrator with a user interface the displays a request for the one-time permission from the higher-level administrator and provides a rationale provided by the lower-level administrator for providing the one-time permission.

16. The IHS of claim 15, wherein the rationale provided by the lower-level administrator is included in the request for the one-time permission issued to the higher-level administrator.

17. A method for supporting a console for use in managing a data center, the method comprising:

detecting a denial of a request by a lower-level administrator of the data center to perform a management task involving an asset of the data center, wherein the request is denied on the basis of the lower-level administrator having insufficient privileges to perform the management task;

in response to detecting the denial of the request by the lower-level administrator based on insufficient privileges, identifying a higher-level administrator with sufficient privileges to authorize a one-time permission for the management task;

automatically upon detecting the denial of the request, issuing a request for the one-time permission from the higher-level administrator for the lower-level administrator to perform only the management task;

when approval is received from the higher-level administrator, configuring a one-time permission authorizing the lower-level administrator to perform only a single instance of the management task only on the asset of the datacenter;

initiating a monitor that detects state changes for the asset of the datacenter of the denied request; and upon the monitor detecting a state change for the asset that corresponds to the management task of the one-time permission, revoking the one-time permission.

18. The method of claim 17, wherein the management task comprises removing an IHS in the datacenter from service.

19. A computer-readable storage device having instructions stored thereon for supporting a console for use in managing a data center, wherein execution of the instructions by one or more processors causes the one or more processors to:

detect a denial of a request by a lower-level administrator of the data center to perform a management task involving an asset of the data center, wherein the request is denied on the basis of the lower-level administrator having insufficient privileges to perform the management task;

in response to detecting the denial of the request by the lower-level administrator based on insufficient privileges, identify a higher-level administrator with sufficient privileges to authorize a one-time permission for the management task;

automatically upon detecting the denial of the request, issue a request for the one-time permission from the higher-level administrator for the lower-level administrator to perform only the management task;

when approval is received from the higher-level administrator, configure a one-time permission authorizing the lower-level administrator to perform only a single instance of the management task only on the asset of the datacenter;

initiate a monitor that detects state changes for the asset of the datacenter of the denied request; and upon the monitor detecting a state change for the asset that corresponds to the management task of the one-time permission, revoke the one-time permission.

20. The computer-readable storage device of claim 19, wherein the configuring of one-time permission comprises specifying a duration after which the one-time permission expires.

\* \* \* \* \*